US008584207B2

(12) United States Patent
Dommety et al.

(10) Patent No.: US 8,584,207 B2
(45) Date of Patent: **\*Nov. 12, 2013**

(54) INFRASTRUCTURE-LESS BOOTSTRAPPING: TRUSTLESS BOOTSTRAPPING TO ENABLE MOBILITY FOR MOBILE DEVICES

(75) Inventors: Gopal Dommety, San Jose, CA (US); Alpesh Patel, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 440 days.

This patent is subject to a terminal disclaimer.

(21) Appl. No.: 12/368,179

(22) Filed: Feb. 9, 2009

(65) Prior Publication Data

US 2009/0144809 A1 Jun. 4, 2009

Related U.S. Application Data

(63) Continuation of application No. 10/992,435, filed on Nov. 17, 2004, now Pat. No. 7,502,331.

(51) Int. Cl.
*H04L 29/06* (2006.01)
(52) U.S. Cl.
USPC .............................................. 726/4; 379/219
(58) Field of Classification Search
USPC ................. 713/153, 181; 726/3, 14, 4, 181
See application file for complete search history.

(56) References Cited

U.S. PATENT DOCUMENTS

| 4,692,918 A | 9/1987 | Elliott et al. |
| 5,016,244 A | 5/1991 | Massey et al. |
| 5,018,133 A | 5/1991 | Tsukakoshi et al. |

(Continued)

FOREIGN PATENT DOCUMENTS

| CH | 694678 | 5/2005 |
| EP | 1 139 634 | 10/2001 |
| WO | WO 01/76134 | 10/2001 |
| WO | WO 02/069605 | 9/2002 |

OTHER PUBLICATIONS

CN Office Action dated Nov. 1, 2010, from CN Appl. No. 200680039901.5.

(Continued)

*Primary Examiner* — Kambiz Zand
*Assistant Examiner* — Ghodrat Jamshidi
(74) *Attorney, Agent, or Firm* — Weaver Austin Villeneuve & Sampson LLP

(57) ABSTRACT

Methods and apparatus for supporting a session in Mobile IP are disclosed. A Mobile Node sends a first Mobile IP message identifying the Mobile Node to a Home Agent, wherein the first Mobile IP message indicates to the Home Agent that the Mobile Node is requesting dynamic configuration of a Mobile-Home authentication key to be shared between the Mobile Node and the Home Agent during the session. A Mobile-Home authentication key to be shared between the Home Agent and the Mobile Node is obtained or generated by the Mobile Node and the Home Agent, where the Mobile-Home authentication key is not valid after the session has ended or during another session. The Home Agent sends a second Mobile IP message to the Mobile Node, the second Mobile IP message including a lifetime associated with the session, wherein the lifetime indicates a lifetime of the key, thereby enabling the Mobile Node to register with the Home Agent using the Mobile-Home authentication key to be shared between the Home Agent and the Mobile Node during the session.

42 Claims, 5 Drawing Sheets

(56) References Cited

U.S. PATENT DOCUMENTS

| | | | |
|---|---|---|---|
| 5,218,600 A | 6/1993 | Schenkyr et al. | |
| 5,371,852 A | 12/1994 | Attanasio et al. | |
| 5,473,599 A | 12/1995 | Li et al. | |
| 5,793,762 A | 8/1998 | Penners et al. | |
| 6,119,160 A | 9/2000 | Zhang et al. | |
| 6,148,074 A | 11/2000 | Milavsky et al. | |
| 6,148,405 A | 11/2000 | Liao et al. | |
| 6,230,012 B1 | 5/2001 | Willkie et al. | |
| 6,339,830 B1 | 1/2002 | See et al. | |
| 6,377,982 B1 | 4/2002 | Rai et al. | |
| 6,466,964 B1 | 10/2002 | Leung et al. | |
| 6,487,605 B1 | 11/2002 | Leung | |
| 6,535,493 B1 | 3/2003 | Lee et al. | |
| 6,560,217 B1 | 5/2003 | Peirce, Jr. et al. | |
| 6,728,536 B1 | 4/2004 | Basilier et al. | |
| 6,760,444 B1 | 7/2004 | Leung | |
| 6,785,823 B1 | 8/2004 | Abrol et al. | |
| 6,795,857 B1 | 9/2004 | Leung et al. | |
| 6,879,690 B2 | 4/2005 | Faccin et al. | |
| 6,904,055 B2* | 6/2005 | Pichna et al. | 370/467 |
| 6,907,016 B2 | 6/2005 | Madour et al. | |
| 6,947,725 B2 | 9/2005 | Aura | |
| 6,956,846 B2 | 10/2005 | Lewis et al. | |
| 6,980,802 B2 | 12/2005 | Jung | |
| 6,999,437 B2* | 2/2006 | Krishnamurthi et al. | 370/331 |
| 7,003,282 B1 | 2/2006 | Ekberg | |
| 7,039,404 B2 | 5/2006 | Das et al. | |
| 7,042,879 B2 | 5/2006 | Eschbach et al. | |
| 7,061,887 B2 | 6/2006 | Fan | |
| 7,065,067 B2 | 6/2006 | Song et al. | |
| 7,073,066 B1 | 7/2006 | Nessett | |
| 7,107,051 B1 | 9/2006 | Walker | |
| 7,107,620 B2* | 9/2006 | Haverinen et al. | 726/29 |
| 7,158,777 B2 | 1/2007 | Lee et al. | |
| 7,168,090 B2 | 1/2007 | Leung | |
| 7,174,018 B1 | 2/2007 | Patil et al. | |
| 7,181,196 B2 | 2/2007 | Patel | |
| 7,218,609 B2 | 5/2007 | Borella et al. | |
| 7,224,673 B1 | 5/2007 | Leung et al. | |
| 7,286,520 B2 | 10/2007 | Takeda et al. | |
| 7,298,847 B2 | 11/2007 | Jing et al. | |
| 7,320,070 B2 | 1/2008 | Baum | |
| 7,389,412 B2 | 6/2008 | Sharma et al. | |
| 7,409,549 B1 | 8/2008 | Leung et al. | |
| 7,475,241 B2 | 1/2009 | Patel et al. | |
| 7,502,331 B2* | 3/2009 | Dommety et al. | 370/254 |
| 7,626,963 B2 | 12/2009 | Patel et al. | |
| 7,636,569 B2* | 12/2009 | Le et al. | 455/435.1 |
| 7,639,802 B2 | 12/2009 | Gundavelli | |
| 7,870,389 B1 | 1/2011 | Leung et al. | |
| 2002/0120844 A1 | 8/2002 | Faccin et al. | |
| 2002/0147820 A1 | 10/2002 | Yokote | |
| 2002/0197979 A1* | 12/2002 | Vanderveen | 455/410 |
| 2003/0005280 A1 | 1/2003 | Bobde et al. | |
| 2003/0028763 A1 | 2/2003 | Malinen et al. | |
| 2003/0069990 A1 | 4/2003 | D'Annunzio et al. | |
| 2003/0115468 A1 | 6/2003 | Aull et al. | |
| 2004/0103282 A1 | 5/2004 | Meier et al. | |
| 2004/0114558 A1 | 6/2004 | Krishnamurthi et al. | |
| 2004/0162105 A1 | 8/2004 | Reddy et al. | |
| 2004/0234075 A1 | 11/2004 | Leung | |
| 2005/0010780 A1 | 1/2005 | Kane et al. | |
| 2005/0025091 A1* | 2/2005 | Patel et al. | 370/328 |
| 2005/0083905 A1 | 4/2005 | Nishida et al. | |
| 2005/0102522 A1 | 5/2005 | Kanda | |
| 2005/0135622 A1 | 6/2005 | Fors et al. | |
| 2005/0135624 A1 | 6/2005 | Tsai et al. | |
| 2005/0138355 A1 | 6/2005 | Chen et al. | |
| 2005/0177515 A1 | 8/2005 | Kalavade et al. | |
| 2005/0177723 A1 | 8/2005 | Huang et al. | |
| 2005/0198506 A1* | 9/2005 | Qi et al. | 713/170 |
| 2006/0046693 A1 | 3/2006 | Tran et al. | |
| 2006/0072759 A1 | 4/2006 | Gundavelli et al. | |
| 2006/0104247 A1 | 5/2006 | Dommety et al. | |
| 2007/0091843 A1 | 4/2007 | Patel et al. | |
| 2007/0124592 A1 | 5/2007 | Oyama | |
| 2007/0230453 A1 | 10/2007 | Giaretta et al. | |
| 2007/0274266 A1 | 11/2007 | Oyama | |

OTHER PUBLICATIONS

US Notice of Allowance dated Sep. 3, 2010, from U.S. Appl. No. 10/328,522.
European Office Action dated Sep. 6, 2006, from corresponding European Patent Application No. 03789813.7 5 pgs.
International Search Report dated Jun. 29, 2004 from the related International Application No. PCT/US03/36850.
U.S. Office Action mailed Jul. 3, 2007 from U.S. Appl. No. 10/328,522, 16 pgs.
U.S. Office Action mailed Jan. 11, 2007 from U.S. Appl. No. 10/328,522, 16 pgs.
U.S. Office Action mailed Jul. 26, 2006 from related U.S. Appl. No. 10/328,522, 14 pgs.
U.S. Office Action mailed Mar. 13, 2007 from U.S. Appl. No. 10/635,882, 16 pgs.
Haverinen et al., "Extensible Authentication Protocol Method for GSM Subscriber Identity Modules (EAPSIM)," Internet Draft, Dec. 21, 2004, 85 pgs.
"Mobile IP," Release 12.0(1)T published on or before Jul. 25, 2002, pp. 1-55.
C. Finseth, RFC 1492, "An Access Control Protocol, Sometimes Called TACACS," 21 pgs., Jul. 1993.
C. Perkins, "IP Mobility Support," RFC 2002, IBM Corporation, Oct. 1996.
C. Perkins, Ed. RFC 3344, "IP Mobility Support for IPv4," Aug. 2002.
C. Perkins, Ed., RFC 3220, "IP Mobility Support for IPv4", 76 pgs. Jan. 2002.
C. Perkins, et al., "AAA Registration Keys for Mobile IP," Internet Draft, http://www.ietf.org/proceedings/00jul/I-D/mobileip-aaa-key-01.txt, Jan. 28, 2000.
C. Perkins, et al., Internet Draft, "AAA Registration Keys for Mobile IP," draft-ietf-mobileip-aaa-key-10.txt, Oct. 23, 2002.
C. Perkins, et al., Internet Draft, "AAA Registration Keys for Mobile IP," draft-ietf-mobileip-aaa-key-13.txt, Jun. 22, 2003.
C. Perkins, et al., RFC 3012, "Mobile IPv4 Challenge/Response Extensions," Nov. 2000.
C. Perkins, "*Mobile IP and Security Issue: An Overview*," Nokia, U.S., Oct. 25, 1999, pp. 131-148, XP010514313.
C. Rigney, et al., RFC 2138, "Remote Authentication Dial in User Service (RADIUS)," pp. 1-65, Apr. 1997.
C. Rigney, RFC 2139 "RADIUS Accounting," Livingston, pp. 1-25, Apr. 1997.
Chambless, et al., "Home Agent Redundancy Protocol (HARP)," Oct. 27, 1997.
D. Carrel and Lol Grant, Internet Draft, "The TACACS+ Protocol," Network Working Group, Internet-Draft, Cisco Systems, pp. 1-42, Jan. 1997.
D. Cong and M. Hamlen and C. Perkins, RFC 2006, "The Definitions of Managed Objects for IP Mobility Support using SMIv2," Motorola and IBM, Oct. 1996.
D. Harkins and D. Carrel, "The Internet Key Exchange (IKE)," Cisco Systems, Jun. 1998.
D. Oran, RFC 1142 "OSI IS-IS Intra-domain Routing Protocol," Feb. 1990.
G. Dommety, et al. RFC 3115, "Mobile IP Vendor/Organization-Specific Extensions," Apr. 2001.
G. Zorn, RFC 2548, "Microsoft Vendor-specific RADIUS Attributes," Mar. 1999.
G. Zorn, RFC 2759, "Microsoft PPP CHAP Extensions, Version 2," Jan. 2000.
J. Kohl, et al., RFC 1510, "The Kerberos Network Authentication Service (V5)" 112 pgs., Sep. 1993.
J. Moy, RFC 1247 "OSPF Version 2," Jul. 19, 1991.
K. Sufatrio, et al., *Mobile IP Registration Protocol: A Security Attack and New Secure Minimal Public-Key Based Authentication*, Parallel Architectures, Algorithms, and Networks, 1999 (I-Span '99) pro-

(56) References Cited

OTHER PUBLICATIONS ceedings. Fourth International Symposium, Perth/Fremantle, Australia, Jun. 23-25, 1999, Los Alamitos, California, IEEE pp. 364-369, XP010341845.
Montenegro, G., RFC 2344, "Reverse Tunneling for Mobile IP," Sun Microsystems, Inc., pp. 1-19, May 1998.
Release notes for 3Com Corporation, "Conducting a Redcundant Route for Network Resiliency," Mar. 1994, *NET Builder Family Bridge/Router* pp. 26-29.
S. Jacobs, et al., Internet Draft, "Mobile IP Public Key Based Authentication," draft-jacobs-mobileip-pki-auth-03.txt, Jul. 9, 2001.
S. Jacobs, "*Mobile IP Public Key Based Authentication*", internet draft, Aug. 1, 1998, pp. 1-27, XP002285008.
S. Jacobs, *Security of Current Mobile IP Solutions*, MILCOM 97 Proceedings, Monterey, California, Nov. 2-5, 1997, IEEE pp. 1122-1128, XP010260752.
T. Li, et al., RFC 2281 "Cisco Hot Standby Router Protocol (HSRP)," Mar. 1998.
Uyless Black, "TCP/IP and Related Protocols," 1992, *McGraw-Hill, Inc.*, pp. 226-249.
Rigney et al., "Remote Authentication Dial in User Service (RADIUS)", RFC 2865, Jun. 2000 (76 pgs.).
Aboba et al., "The Network Access Identifier", RFC 2486, Jan. 1999 (8 pgs.).
Calhoun et al., "Mobile IP Network Access Identifier Extension for IPv4", RFC 2794, Mar. 2000 (9 pgs.).
D. Eastlake "DNS Security Operational Considerations", RFC 2541, Mar. 1999 (7 pgs.).
Johnson et al., "Mobility Support in IPv6", RFC 3775, Jun. 2004 (165 pgs.).
U.S. Office Action dated Aug. 20, 2007 from related U.S. Appl. No. 10/635,882, 15 pgs.
International Search Report and Written Opinion dated May 21, 2007, from corresponding International Application No. PCT/US06/41511.
Calhoun et al., "Diameter Base Protocol," RFC 3588, Sep. 2003 (133 pgs.).
C. Perkins et al., "Authentication, Authorization, and Accounting (AAA) Registration Keys for Mobile IPv4," RFC 3957, Mar. 2005, (27 pgs.).
U.S. Office Action dated Dec. 21, 2007 from related U.S. Appl. No. 10/328,522, 15 pages.
U.S. Office Action dated Feb. 5, 2008 from related U.S. Appl. No. 10/635,882, 15 pgs.
U.S. Office Action dated Mar. 3, 2008 from related U.S. Appl. No. 11/258,720, 14 pages.
U.S. Office Action dated Mar. 17, 2008 from related U.S. Appl. No. 10/992,435, 15 pages.
U.S. Office Action dated Aug. 6, 2008 from related U.S. Appl. No. 11/258,720, 15 pages.
Notice of Allowance and Allowed Claims dated Aug. 29, 2008 from related U.S. Appl. No. 10/635,882, 17 pages.
U.S. Office Action dated Oct. 14, 2008 from U.S. Appl. No. 10/951,499.
U.S. Office Action dated Oct. 16, 2008 from U.S. Appl. No. 10/328,522.
Notice of Allowance and Allowed Claims dated Oct. 23, 2008 from U.S. Appl. No. 10/992,435.
Office Action dated Jan. 6, 2009 issued for CA Patent Application No. 2,506,670.
US Notice of Allowance and Allowed Claims dated Dec. 21, 2011 from U.S. Appl. No. 12/645,286.
Glass, et al., Network Working Group Request for Comments: 2977, pp. 1-27, The Internet Society, Oct. 2000.
Haverinen, et al., "Authentication and Key Generation for Mobile IP using GSM Authentication and Roaming", ICC 2001. 2001 IEEE International Conference on Communications, New York: IEEE; US vol. 8, Jun. 11 2001, pp. 2453-2457, XP010553567.
Haverinen, et al., GSM SIM Authentication and Key Generation for Mobile IP draft-haverinen-mobileip-gsmsim-02.txt, Mobile IP Working Group, Nokia, Internet Draft, Apr. 2001, 20 pgs.
Perkins, "Mobile IP", IEEE Communications Magazine, pp. 66-82, May 2002.
AU Office Action dated May 2, 2008, from AU Appl. No. 2003294330.
CA Office Action dated Jan. 6, 2009, from CA Appl. No. 2,506,670.
CN Office Action dated Sep. 5, 2008, from CN Appl. No. 200380103939.0.
CN Second Office Action dated Feb. 20, 2009, from CN Appl. No. 200380103939.0.
CN Third Office Action dated Jun. 19, 2009, from CN Appl. No. 200380103939.0.
EP Extended Search Report dated Jan. 9, 2009, from EP Appl. No. 06817346.7.
US Final Office Action mailed Oct. 2, 2009, from U.S. Appl. No. 10/328,522.
US Notice of Allowance dated May 24, 2010, from U.S. Appl. No. 10/328,522.
US Notice of Allowance dated Aug. 12, 2009, from U.S. Appl. No. 10/951,499.
US Office Action mailed Feb. 13, 2009, from U.S. Appl. No. 11/258,720.
US Notice of Allowance dated Jul. 24, 2009, from U.S. Appl. No. 11/258,720.

\* cited by examiner

Discovery message to MN 300

| Local IP address (e.g., Collocated care-of address) 302 | HA1 address and certificate/public key 304 | HA2 address and certificate/public key 306 | ..... | HAn address and certificate or public key 308 |
|---|---|---|---|---|
| Opt. home prefix (To discover HA or generate local IP address) 310 | | | | |

FIG.3

Mobile IP message from MN to HA (RRQ/BU) 400

| IP Header: Source address (e.g., COA) Destination address: HA 402 | Option 1: Mobile-Home Authentication Header/Extension (HMAC-MID5) using random shared key across entire msg Option 2: Encrypt random shared key using HA public key 414 | Token (or Mobile-Home authentication key) 406 | MN identifier (e.g., MAC, NAI, CCOA) 408 | Opt. Home Address suggestion (e.g., old Home Address, COA) 410 |
|---|---|---|---|---|
| Opt. Source Address (e.g., CCOA) 412 | Opt. MN's public key or random shared key 404 | Opt. Suggested lifetime 416 | Opt. Session ID 418 | |

FIG.4

Mobile IP message from HA to MN (RRP/BA) 500

| IP Header: Source address (e.g., HA) Destination address: COA 502 | Option 1: Mobile-Home Authentication Header/Extension (HMAC-MID5) using random shared key across entire msg Option 2: Encrypt random shared key using MN public key 504 | MN identifier (e.g., MAC, NAI, CCOA) 506 | Home Address assigned 508 | Lifetime (e.g., associated with Home Address and shared key) 510 | Home Agent 512 |
|---|---|---|---|---|---|
| Opt. Destination Address (e.g., COA) 514 | Token 516 | Opt. Session ID 518 | | | |

FIG.5

INFRASTRUCTURE-LESS BOOTSTRAPPING: TRUSTLESS BOOTSTRAPPING TO ENABLE MOBILITY FOR MOBILE DEVICES

RELATED APPLICATIONS

This application is a continuation application of U.S. application Ser. No. 10/992,435, entitled "Infrastructure-less Bootstrapping: Trustless Bootstrapping to Enable Mobility for Mobile Devices," filed on Nov. 17, 2004, by Dommety et al, which is incorporated herein for all purposes.

BACKGROUND OF THE INVENTION

The present invention relates to Mobile IP network technology. More specifically, this invention relates to mechanisms for generating a Mobile-Home authentication key to be used to support mobility of a Mobile Node during a single Mobile IP session.

Mobile IP is a protocol which allows laptop computers or other mobile computer units (referred to as "Mobile Nodes" herein) to roam between various sub-networks at various locations—while maintaining internet and/or WAN connectivity. Without Mobile IP or a related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 3344 of the Network Working Group, C. Perkins, Ed., "IP Mobility Support for IPv4," August 2002. Mobile IP is also described in the text "Mobile IP Unplugged" by J. Solomon, Prentice Hall. Both of these references are incorporated herein by reference in their entireties and for all purposes.

The Mobile IP process in a Mobile IPv4 environment are illustrated in FIG. 1. As shown there, a Mobile IP environment 2 includes the internet (or a WAN) 4 over which a Mobile Node 6 can communicate remotely via mediation by a Home Agent 8 and may also include a Foreign Agent 10. In the absence of a Foreign Agent in a Mobile IPv4 environment, or in a Mobile IPv6 environment in which a Foreign Agent is not implemented, the Mobile Node 6 can obtain a topologically correct IP address (i.e., collocated IP address) and register this IP address with the Home Agent. (In a Mobile IPv6 environment, this is accomplished via an Access Router rather than a Foreign Agent.) Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various solicitations and advertisements which form part of the Mobile IP protocol. When Mobile Node 6 engages with network segment 14, Foreign Agent 10 relays a registration request to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the care-of address (e.g., a collocated care-of address or the Foreign Agent's IP address) in association with the identity of Mobile Node 6. Further, the Foreign Agent 10 updates an internal "visitor table" which specifies the Mobile Node address, Home Agent address, etc. In effect, the Mobile Node's home base IP address (associated with segment 12) has been shifted to the Foreign Agent's IP address (associated with segment 14).

Now, suppose that Mobile Node 6 wishes to send a message to a Correspondent Node 18 from its new location. In Mobile IPv4, a message from the Mobile Node is then packetized and forwarded through Foreign Agent 10 over the internet 4 and to Correspondent Node 18 (as indicated by the dotted line "packet from MN") according to a standard internet protocol. If Correspondent Node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from Correspondent Node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling." In the absence of a Foreign Agent, packets are tunneled directly to the Mobile Node 6 collocated care-of address.

The Mobile IP protocol typically requires the configuration of security associations between three entities: the Mobile Node, the Home Agent, and the Foreign Agent. The security-association defines an authentication key and an algorithm to be applied during the authentication process. Specifically, the authentication keys that typically need to be configured are the Mobile-Home authentication key on the Mobile Node and the Home Agent, the Foreign-Home authentication key on the Foreign Agent and the Home Agent (in a Mobile IPv4 environment), and the Mobile-Foreign authentication key on the Mobile Node and the Foreign Agent (in a Mobile IPv4 environment). These keys are typically statically configured on the Home Agent, Foreign Agent, and Mobile Node.

In enterprise deployments, configuration of the authentication keys among the large number of entities is a challenging, complex and tedious administrative task. Patent application Ser. No. 10/635,882, entitled "METHODS AND APPARATUS FOR DYNAMIC SESSION KEY GENERATION AND REKEYING," by Patel et al and patent application Ser. No. 10/328,522, entitled "METHODS AND APPARATUS FOR AUTHENTICATING MOBILITY ENTITIES USING KERBEROS," by Leung et al each discloses a mechanism for dynamically generating a Mobile-Home authentication key on both the Home Agent and the Mobile Node, and are incorporated herein by reference for all purposes.

Typically, the dynamic generation of keys such as Mobile-Home authentication key requires some sort of mutual authentication between the Mobile Node and the network. Specifically, the identity of the Mobile Node is generally authenticated in the Mobile IP environment in order to ensure that the dynamic generation of the Mobile-Home authentication key is a secure process.

In many networks today, there are other mechanisms that perform authentication of the Mobile Node, such as those performed at the Data Link Layer (Layer 2) or the Network Layer (Layer 3). For instance, authentication at the Point-to-Point Protocol (PPP) layer or the Extensible Authentication Protocol (EAP) layer may be performed. As a result, the authentication process typically performed in the Mobile IP environment is often a duplicative process. In such environments, since the basic network access is authenticated and secure, having yet another level of authentication merely increases barriers to deployment.

Similarly, "open networks" support roaming, but security credentials are not provisioned. In these networks, security is implied from physical presence in the network. As a result, authentication at the user level is not required. In an "open network," authentication within the Mobile IP environment is similarly unnecessary.

In view of the above, it would be beneficial if a simplified mechanism for dynamically generating Mobile-Home authentication keys could be established.

SUMMARY OF THE INVENTION

The present invention enables a Mobile-Home authentication key to be generated in a Mobile IP environment. This is accomplished in an environment in which authentication of the Mobile Node is not required in order to generate the Mobile-Home authentication key. Since the Mobile-Home authentication key is applicable during a single session, the Mobile Node may register with the Home Agent during that session using the Mobile-Home authentication key to update the Home Agent as to its new location or to request an extension to the lifetime of its binding maintained at the Home Agent. In this manner, the Mobile IP registration process is streamlined in an environment in which Mobile IP authentication of the Mobile Node is not required.

In accordance with one aspect of the invention, methods and apparatus for supporting and creating a session in Mobile IP are implemented by a Home Agent. First, the Home Agent receives a first Mobile IP message identifying a Mobile Node from the Mobile Node, where the first Mobile IP message indicates to the Home Agent that the Mobile Node is requesting dynamic configuration of a Mobile-Home authentication key to be shared between the Mobile Node and the Home Agent during the session. The Home Agent then obtains the Mobile-Home authentication key to be shared between the Home Agent and the Mobile Node during the session from the first Mobile IP message or generates the Mobile-Home authentication key to be shared between the Home Agent and the Mobile Node during the session. It is important to note that the Mobile-Home authentication key is not valid after the session has ended or during another session. The Home Agent sends a second Mobile IP message to the Mobile Node, which may include a lifetime associated with the session, where the lifetime indicates a lifetime of the Mobile-Home authentication key, thereby enabling the Mobile Node to register with the Home Agent using the Mobile-Home authentication key to be shared between the Home Agent and the Mobile Node during the session.

In accordance with another aspect of the invention, methods and apparatus for registering a Mobile Node with a Home Agent during a session are supported. The Mobile Node sends a first Mobile IP message identifying the Mobile Node to the Home Agent, where the first Mobile IP message indicates to the Home Agent that the Mobile Node is initiating dynamic configuration of a Mobile-Home authentication key to be shared between the Mobile Node and the Home Agent during the session. The Mobile Node then receives a second Mobile IP message identifying the Mobile Node from the Home Agent. The second Mobile IP message includes a lifetime associated with the session, where the lifetime indicates a lifetime of the Mobile-Home authentication key to be shared between the Home Agent and the Mobile Node, thereby enabling the Mobile Node to register with the Home Agent using the Mobile-Home authentication key to be shared between the Home Agent and the Mobile Node. However, it is important to note that the Mobile-Home authentication key is not valid after the session has ended or during another session.

When the Mobile Node obtains the Mobile-Home authentication key from the second Mobile IP message or generates the Mobile-Home authentication key to be shared between the Home Agent and the Mobile Node during the session, the Mobile Node may register with the Home Agent to extend the lifetime or to notify the Home Agent of its care-of address when the Mobile Node moves to a new location (e.g., care-of address). In order to initiate registration, the Mobile Node sends a third Mobile IP message to an IP address of the Home Agent, where the third Mobile IP message is a registration request or a binding update. The third Mobile IP message is secured by the Mobile-Home authentication key. The Mobile Node receives a fourth Mobile IP message from the Home Agent, where the fourth Mobile IP message is a registration reply or a binding acknowledgement. The fourth Mobile IP message is also protected by the Mobile-Home authentication key.

In accordance with yet another aspect of the invention, the Mobile Node and Home Agent secure transmissions prior to generation of the Mobile-Home authentication key via public-private keys. Specifically, both the Mobile Node and the Home Agent each have a public and private key associated therewith. When the Mobile Node sends a message (e.g., the first Mobile IP message) to the Home Agent, the first Mobile IP message (or portion thereof) is secured by the Home Agent's public key. This first Mobile IP message (or portion thereof) may then be decrypted by the Home Agent using the Home Agent's private key. In accordance with one embodiment, the message that is sent by the Mobile Node to the Home Agent includes a session key that the Home Agent may use to encrypt the second Mobile IP message (or portion thereof) prior to transmitting the second Mobile IP message to the Mobile Node. In accordance with another embodiment, when the Home Agent sends a message (e.g., the second Mobile IP message) to the Mobile Node, the second Mobile IP message (or portion thereof) is secured by the Mobile Node's public key. This second Mobile IP message (or portion thereof) may then be decrypted by the Mobile Node using the Mobile Node's private key.

In accordance with another aspect of the invention, the invention pertains to a system operable to perform and/or initiate the generation of a Mobile-Home authentication key to be used to encrypt packets transmitted between a Mobile Node and a Home Agent during a session. The system includes one or more processors and one or more memories. At least one of the memories and processors are adapted to provide at least some of the above described method operations. In yet a further embodiment, the invention pertains to a computer program product for performing the disclosed methods. The computer program product has at least one computer readable medium and computer program instructions stored within at least one of the computer readable product configured to perform at least some of the above described method operations.

In accordance with various embodiments, it is assumed that the Mobile Node does not have a static home address. As a result, the Home Agent assists in assigning a home address to the Mobile Node. The home address assignment may be performed directly by the Home Agent or via a separate server.

These and other features and advantages of the present invention will be presented in more detail in the following specification of the invention and the accompanying figures, which illustrate by way of example the principles of the invention.

BRIEF DESCRIPTION OF THE DRAWINGS

FIG. 3 is a diagram illustrating an exemplary packet that may be transmitted to a Mobile Node including information associated with a set of Home Agents in accordance with one embodiment of the invention.

FIG. 4 is a diagram illustrating an exemplary message that may be transmitted by a Mobile Node to a Home Agent to initiate the generation of a Mobile-Home authentication key for a particular session in accordance with one embodiment of the invention.

FIG. 5 is a diagram illustrating an exemplary message that may be transmitted by a Home Agent to the Mobile Node in order to provide an allocated home address and lifetime to the Mobile Node in accordance with one embodiment of the invention.

DETAILED DESCRIPTION OF SPECIFIC EMBODIMENTS

Figure 1:
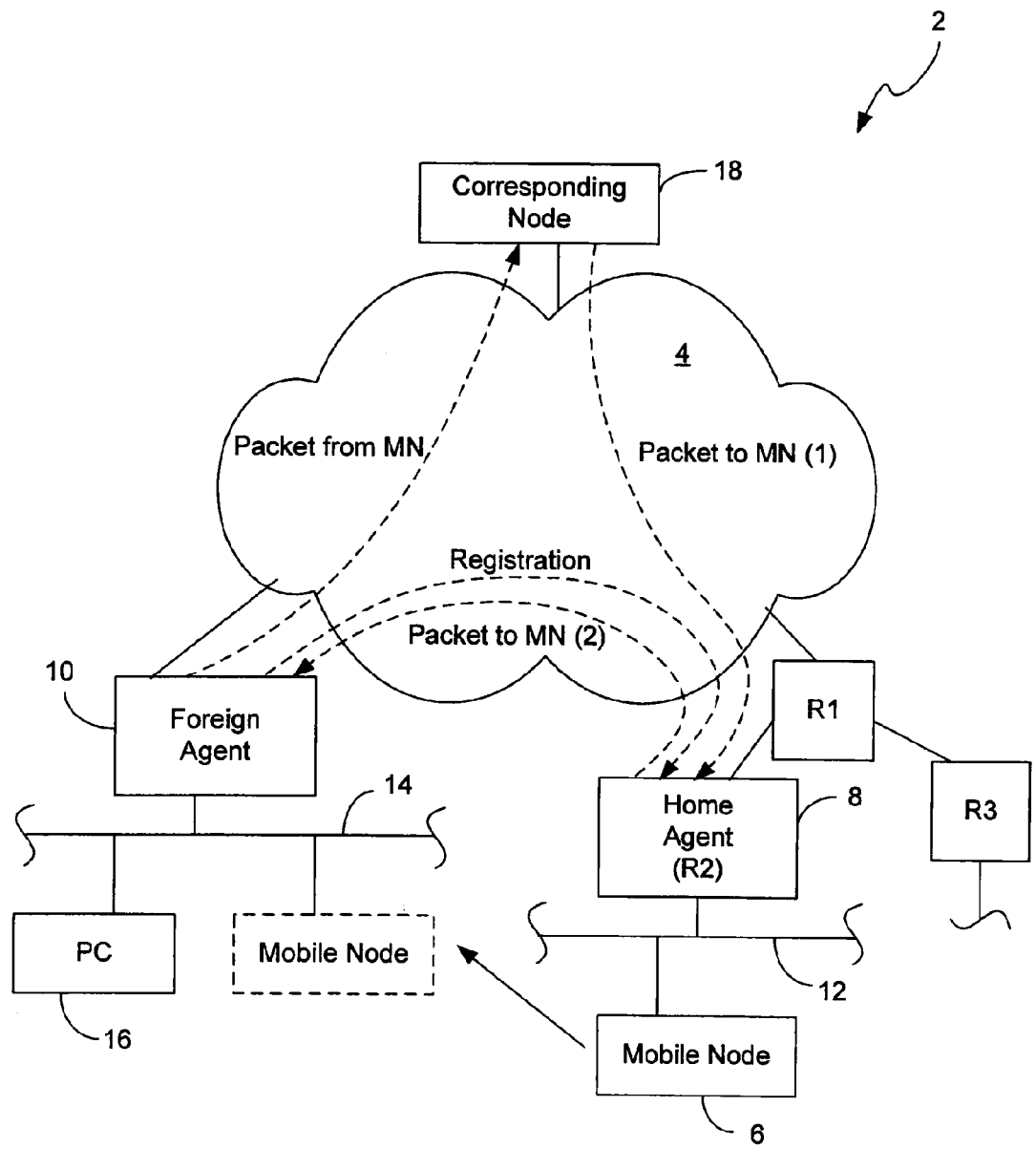
FIG. 1 is a diagram of a Mobile IP network segment and associated environment.

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The disclosed embodiments enable a Mobile-Home authentication key to be dynamically generated for use in a particular session. The Mobile-Home authentication key may be generated according to any suitable mechanism, such as that disclosed in patent application Ser. No. 10/635,882, entitled "METHODS AND APPARATUS FOR DYNAMIC SESSION KEY GENERATION AND REKEYING," by Patel et al and patent application Ser. No. 10/328,522, entitled "METHODS AND APPARATUS FOR AUTHENTICATING MOBILITY ENTITIES USING KERBEROS," by Leung et al. Specifically, the Mobile-Home authentication key may be transmitted between the Mobile Node and Home Agent (e.g., where the Mobile-Home authentication key is generated by either the Mobile Node or the Home Agent). Alternatively, key material (e.g., a token) may be transmitted between the Mobile Node and the Home Agent for use in generating the Mobile-Home authentication key. Once generated, the Mobile-Home authentication key is "active" only during a single session.

Since the described embodiments are performed without authentication of the Mobile Node in Mobile IP, the embodiments set forth are particularly useful in environments in which authentication of the Mobile Node has already been performed or in which authentication of the Mobile Node is unnecessary. These environments include, but are not limited to, environments in which Layer 2 or Layer 3 authentication has already been performed or in which authentication has been performed to gain access to the network.

Once a Mobile-Home authentication key has been generated, the Mobile-Home authentication key may be identified by a Security Parameter Index (SPI). The Security Parameter Index is an identifier that specifies a security association, or "row" in a security-association table, that a receiver should use to interpret a received packet. The security-association defines an authentication key and the algorithm to be applied during the authentication process. The use of a security association to authenticate a packet is described in further detail in U.S. patent application Ser. No. 09/227,399, entitled "Mobile IP Authentication," by K. Leung, which is incorporated herein by reference for all purposes.

In the described embodiments, it is assumed that the Mobile Node does not have a static home address. As a result, the Home Agent assists in assigning a home address to the Mobile Node. The home address assignment may be performed directly by the Home Agent or via another separate server.

Figure 2:
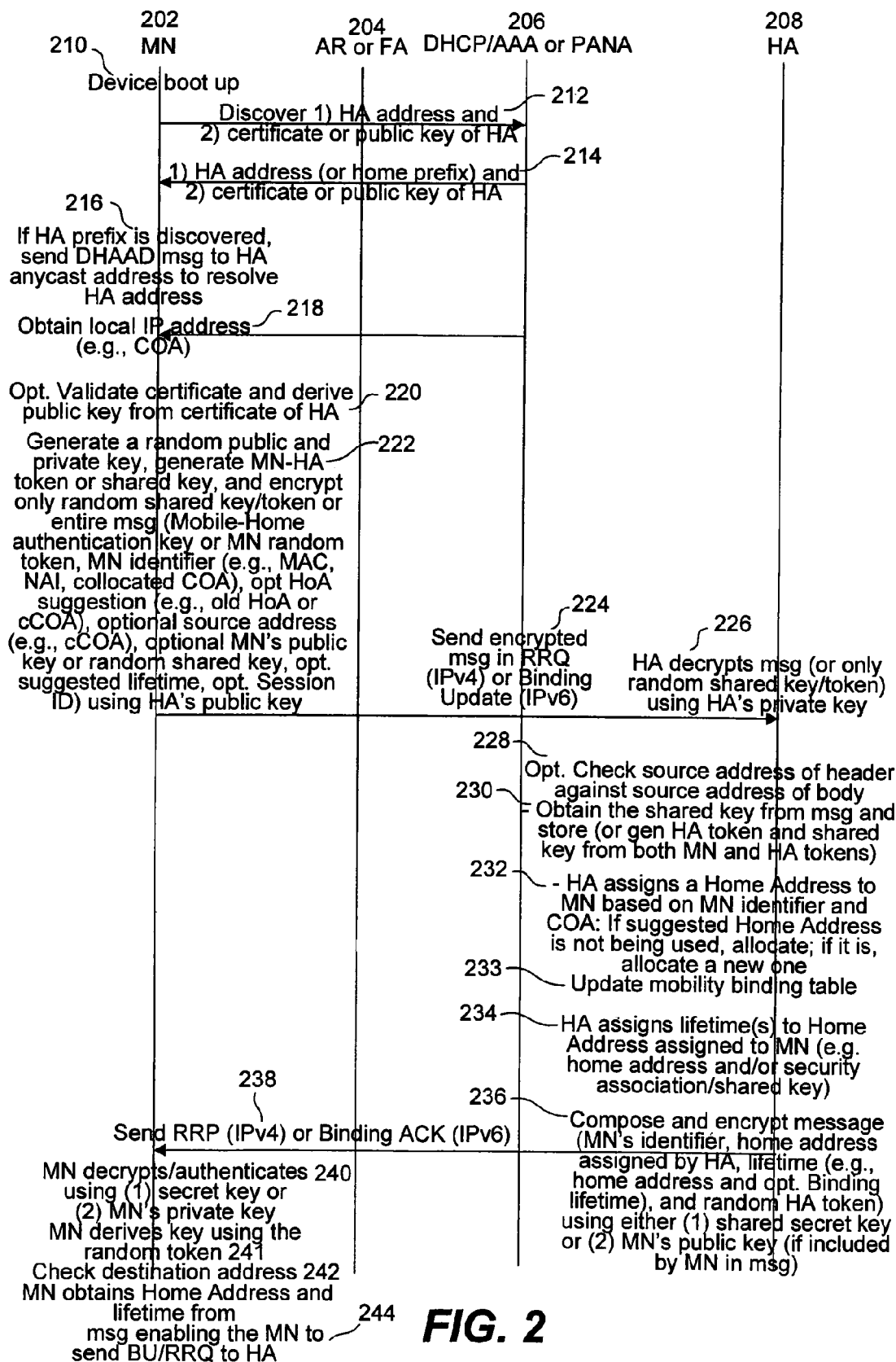
FIG. 2 is a transaction flow diagram illustrating a message flow supporting dynamic generation of a Mobile-Home authentication key in accordance with one embodiment of the invention in which the Mobile-Home authentication key is active only during a single session.

FIG. 2 is a transaction flow diagram illustrating a message flow supporting dynamic generation of a Mobile-Home authentication key in accordance with one embodiment of the invention in which the Mobile-Home authentication key is active only during a single session. Steps performed by the Mobile Node, an Access Router or a Foreign Agent, a server such as a the Dynamic Host Configuration Protocol (DHCP) or a AAA server or a server implementing the Protocol for carrying Authentication and Network Access information (PANA), and a Home Agent, are represented by vertical lines 202, 204, 206, and 208, respectively.

The AAA represents authentication, authorization, and accounting. Various protocols such as the Remote Authentication Dial In User Service (RADIUS) and TACACS+ may be implemented to implement a AAA server. Note that the Home Agent or Foreign Agent providing accounting information to the server must provide communications in formats required by the AAA server protocol. Both RFC 2138 and subsequent version RFC 2865 describe the RADIUS Protocol and are hereby incorporated by reference. Similarly, RFC 1492 describes TACACS and the Internet-Draft "The TACACS+ Protocol Version 1.78," available at http://www.i-etf.org/internet-drafts/draft-grant-tacacs-02.txt, describes TACACS+. Both of these documents are incorporated herein by reference for all purposes.

In accordance with one embodiment, a Mobile-Home authentication key is generated for use in a single session. A new session may be initiated when the Mobile Node boots up or restarts. Similarly, a session may be discontinued when the Mobile Node reboots.

When the Mobile Node boots up at 210, it obtains an IP address of a Home Agent in its home network and may also obtain a certificate or public key associated with the Home Agent at 212. In general, a public key may be used to encrypt a packet while a corresponding private key may be used to decrypt the packet, as set forth in RFC 2541, which is incorporated herein by reference for all purposes. A certificate may be used to generate a public key, as disclosed in RFC 2865, which is incorporated herein by reference for all purposes. Specifically, the Mobile Node may send a request for this information to a server such as a DHCP or AAA server or, alternatively, a server implementing PANA. The server then sends this information at 214 to the Mobile Node.

The information received at 214 by the Mobile Node may include the Home Agent address, or may include a "home prefix" (e.g., a network prefix of a Home Agent in the Mobile Node's home network). In the event that the information includes the "home prefix," the Mobile Node may obtain an IP address of a Home Agent in the home network identified by the home prefix. The Home Agent address may be obtained by sending a Dynamic Home Agent Address Discovery (DHAAD) message in accordance with RFC 3775, which is incorporated by reference for all purposes, to the Home Agent anycast address to resolve the Home Agent address at 216. In Mobile IPv6, the anycast address communicates between a single sender and the nearest of several receivers in a group. Thus, the anycast address may be used to identify the closest Home Agent in the home network.

The Mobile Node may also obtain a local IP address at 218 (e.g., collocated care-of address). The Home Agent address, certificate or public key, and local IP address may be transmitted to the Mobile Node directly in a unicast message, or may be transmitted in a broadcast message to a group of Mobile Nodes. It is also important to note that the Home Agent address and certificate/public key may be provided for multiple Home Agents in the message that is transmitted. Moreover, the Home Agent address, certificate or public key, and local IP address may be sent to the Mobile Node in one or several discovery packets. An exemplary discovery packet will be described in further detail below with reference to FIG. 3.

As described above, a discovery packet may include a public key or a certificate of at least one Home Agent. If the discovery packet includes a certificate rather than a public key, the Mobile Node validates the certificate and generates the public key of the Home Agent from the certificate at 220 according to RFC 2541.

In accordance with one embodiment, in order to secure the transmissions between the Mobile Node and the Home Agent before a Mobile-Home authentication key for the session is established, public and private keys are implemented in accordance with RFC 2541. Specifically, the Mobile Node has a public and private key, where the public key is used by the Home Agent to encrypt transmissions to the Mobile Node and the private key is used by the Mobile Node to decrypt those transmissions. Similarly, the Home Agent has a public and private key, where the public key is used by the Mobile Node to encrypt transmissions to the Home Agent and the private key is used by the Home Agent to decrypt those transmissions.

Thus, the Mobile Node generates a public key and a private key at 222, if they have not already been generated or configured. The Mobile Node then generates a first Mobile IP message and sends the first Mobile IP message to the Home Agent at 224. The first Mobile IP message or portion thereof may be encrypted prior to transmission to the Home Agent. Specifically, the Mobile Node may generate a token for use by the Home Agent in the generation of the Mobile-Home authentication key, which may be provided in the first Mobile IP message. Alternatively, the Mobile Node may generate the Mobile-Home authentication key, which may be provided in the first Mobile IP message. In either case, the Mobile Node may wish to encrypt only the Mobile-Home authentication key or a portion thereof (e.g., a shared key and/or the token) rather than the entire message. Encryption of the first Mobile IP message (or portion thereof) may be performed using the Home Agent's public key that has been previously obtained or generated by the Mobile Node as set forth above.

The first Mobile IP message may be a message composed in any suitable format. The first Mobile IP message may also be a registration request transmitted in accordance with Mobile IPv4 or, alternatively, the first Mobile IP message may be a Binding Update transmitted in accordance with Mobile IPv6 as set forth in RFC 3775, which is incorporated herein by reference for all purposes. Any extensions or options may be provided, as appropriate.

An exemplary first Mobile IP message will be described in further detail below with reference to FIG. 4. The first Mobile IP message will include a Mobile Node identifier identifying the Mobile Node, such as a Media Access Control (MAC) address, Network Access Identifier (NAI) in accordance with RFC 2486, which is incorporated herein by reference, or collocated care-of address. In accordance with one embodiment, the NAI may be transmitted in an extension as set forth in RFC 2794, which is incorporated herein by reference for all purposes. The first Mobile IP message may also include the Mobile-Home authentication key or, alternatively, a token to be used to generate the Mobile-Home authentication key. In addition, the first Mobile IP message may include a suggested home address (e.g., old home address or collocated care-of address). The Mobile Node may also provide its source address in the body of the first Mobile IP message to enable the Home Agent to check the source address in the body against that provided in the header of the first Mobile IP message, thereby helping to prevent spoofing by another node. The Mobile Node may also provide its public key in the first Mobile IP message, thereby enabling a Home Agent that does not already have the public key of the Mobile Node to obtain it from the first Mobile IP message. Alternatively, the Mobile Node may provide a random shared key in the first Mobile IP message to enable the Home Agent to encrypt its "reply" message to the Mobile Node. The Mobile Node may also provide a suggested lifetime in the first Mobile IP message, as well as a session identifier that identifies the session.

When the Home Agent receives the first Mobile IP message at 226, it decrypts the first Mobile IP message (or portion thereof) using the Home Agent's private key. As set forth above, since the first Mobile IP message may include the Mobile-Home authentication key or a token to be used by the Home Agent to generate the Mobile-Home authentication key, this key or token may be the only material encrypted.

If the body of the first Mobile IP message includes the source address provided in the header of the first Mobile IP message, the Home Agent verifies that the source address in the header is the same as that in the body of the first Mobile IP message at 228. If the source addresses are not the same, the Home Agent rejects the first Mobile IP message. Otherwise, the process continues at 230.

The Home Agent obtains either the Mobile-Home authentication key or the token generated by the Mobile Node from the first Mobile IP message at 230. If the first Mobile IP message includes a token, the Home Agent also generates a token and generates the Mobile-Home authentication key from the token generated by the Mobile Node and the token generated by the Home Agent. Any suitable algorithm for generating an authentication key from both the tokens may be used, such as a Message Authentication Code (MAC) algorithm (e.g., MD5, SHA1), where both of the tokens are inputs to the algorithm. The Home Agent then stores the Mobile-Home authentication key.

The Home Agent then assigns a home address to the Mobile Node at 232. Specifically, if the Mobile Node has suggested a home address, the Home Agent determines whether the suggested home address is available. If the suggested home address is available, the suggested home address is allocated to the Mobile Node. Otherwise, another home address is allocated to the Mobile Node for use during the session (e.g., from a pool of available IP addresses). Specifically, the Home Agent may assign a home address such that the home address is associated with a particular Mobile Node identifier. In addition, the home address may be associated with a particular tunnel between the Mobile Node and the Home Agent. In other words, the home address may be associated with a particular interface of the Mobile Node. The home address may also be associated with a particular collocated care-of address. Once the home address has been allocated, the Mobile-Home authentication key may be stored such that it is associated with the allocated home address, as well as the lifetime. It is important to note that the home address and associated binding are not generated and granted for an infinite lifetime.

In accordance with one embodiment, if a new message is received requesting a particular home address that is already in use, or a new message is received from a Mobile Node having the same credentials (e.g., Mobile Node identifier), a new home address is assigned to the Mobile Node. In this manner, the existing session is not disturbed, thereby preventing spoofing by another node.

The Home Agent may then update its mobility binding table associating the allocated home address with its care-of address at 233. It is important to note that the binding is created without authenticating the Mobile Node in Mobile IP.

The Home Agent also assigns a lifetime to the Mobile Node at 234. Specifically, if the Mobile Node has provided a suggested lifetime in the first Mobile IP message, the lifetime may be less than or equal to, or possibly greater than, the suggested lifetime. Although a binding generally has an associated lifetime, which may be extended via a subsequent registration by the Mobile Node, the lifetime is typically not associated with a key such as the Mobile-Home authentication key. Moreover, the lifetime is generally inapplicable to the home address or its ability to be used in another session. In the described embodiments, the Mobile-Home authentication key can only be used by the Mobile Node and Home Agent during this particular session. Thus, the lifetime of the Mobile-Home authentication key (and corresponding security association) is the same as that of the binding maintained by the Home Agent. In addition, the lifetime may also be associated with the allocated home address to ensure that the home address is only used during this particular session (e.g., Mobile IP session).

The Home Agent then generates a second Mobile IP message at 236 and sends the second Mobile IP message to the Mobile Node at 238. The second Mobile IP message or portion thereof may be encrypted prior to transmission to the Mobile Node. Specifically, the Home Agent may generate a token for use by the Mobile Node in the generation of the Mobile-Home authentication key, which may be provided in the second Mobile IP message. The Home Agent may wish to encrypt only the token (or another portion of the second Mobile IP message) rather than the entire message. Encryption of the second Mobile IP message (or portion thereof) may be performed using the Mobile Node's public key, or the Home Agent may apply a key provided by the Mobile Node in the first Mobile IP message.

The second Mobile IP message may be a message composed in any suitable format. The second Mobile IP message may also be a registration reply transmitted in accordance with Mobile IPv4 or, alternatively, the second Mobile IP message may be a Binding Acknowledgement transmitted in accordance with Mobile IPv6 as set forth in RFC 3775, which is incorporated herein by reference for all purposes.

An exemplary second Mobile IP message will be described in further detail below with reference to FIG. 5. The second Mobile IP message will include a Mobile Node identifier identifying the Mobile Node, such as a MAC address, NAI, or collocated care-of address. The second Mobile IP message will also include the allocated home address and the assigned lifetime to be applied to the Mobile-Home authentication key. The second Mobile IP message may also include a token to be used by the Mobile Node to generate the Mobile-Home authentication key. The Home Agent may also provide the destination address in the body of the second Mobile IP message to enable the Mobile Node to check the destination address in the body against its own address (e.g., that provided in the header of the second Mobile IP message), thereby helping to prevent spoofing by another node. The Home Agent may also provide a session identifier that identifies the session in the second Mobile IP message.

When the Mobile Node receives the second Mobile IP message at 240, it decrypts the second Mobile IP message (or portion thereof) using the Mobile Node's private key (or the shared secret key) at 241, as appropriate. The Mobile Node may then generate the Mobile-Home authentication key using the token provided by the Home Agent in the second Mobile IP message at 241 using an algorithm such as a MAC algorithm. In addition, the Mobile Node may associate the Mobile-Home authentication key with the allocated home address, as well as the lifetime provided for the session. This may be desirable, since the Mobile Node may support multiple sessions and therefore multiple allocated home addresses for which a separate Mobile-Home authentication key is generated.

If the body of the second Mobile IP message includes the destination address that is provided in the header of the second Mobile IP message, the Mobile Node verifies that the destination address in the header is the same as that in the body of the second Mobile IP message (e.g., the same as its own local IP address) at 242. If the destination addresses are not the same, the Mobile Node rejects the second Mobile IP message. Otherwise, the Mobile Node obtains the allocated home address and the lifetime from the second Mobile IP message at 244.

The Mobile Node may then register with its Home Agent via a third Mobile IP message (e.g., via a registration request or binding update message) to extend its registration lifetime or when the Mobile Node moves to a new care-of address, thereby enabling the Home Agent to forward traffic to the new care-of address. During the registration process, a Mobile-Home Authentication Extension (MHAE) may be appended to the registration request (or Binding Update) using the dynamically generated Mobile-Home authentication key. The MHAE is generated according to standard processes using the Mobile-Home authentication key shared between the Mobile Node and the Home Agent. When the Home Agent receives this third Mobile IP message, the Home Agent may verify the authentication code in the MHAE and update its binding maintained for the allocated home address, as appropriate, in accordance with standard Mobile IP processes. The Home Agent then sends a fourth Mobile IP message (e.g., registration reply or Binding Acknowledgement) to the Mobile Node. Again, the MHAE may be appended to the registration reply (or Binding Acknowledgement). The Mobile Node verifies that the registration reply was constructed by a valid Home Agent by verifying the authentication code in the MHAE using the Mobile-Home authentication key. The Mobile Node can then be assured that the Home Agent has recorded its new location and that any lifetime extension provided by the Home Agent is valid.

When the Mobile Node reboots (or the underlying session has ended), the Mobile IP session is also terminated. Similarly, when the lifetime expires, the session is terminated. When the session has ended, the Home Agent may de-allocate the home address that has been allocated for that particular session. Similarly, the Mobile Node may "de-activate" the home address or delete the home address that has been allocated to it for that session. Thus, the lifetime that has been allocated by the Home Agent to the Mobile Node for that session and its associated Mobile-Home authentication key may also indicate a lifetime of the allocated home address. In addition, the Mobile Node may delete the Mobile-Home authentication key that is no longer valid.

FIG. 3 is a diagram illustrating an exemplary discovery packet that may be transmitted to a Mobile Node including information associated with a set of Home Agents in accordance with one embodiment of the invention. In this example, the discovery packet is 300 includes a local IP address 302 of the Mobile Node (e.g., collocated care-of address). In addition, the discovery packet 300 also includes a Home Agent address and public key or certificate for one or more Home Agents, as shown at 304-308. In addition, or alternatively, the discovery packet 300 may include a home prefix 310 identifying a home network prefix of the home network of the Mobile Node. Using this home network prefix, the Mobile Node may request a home address in the home network or discover a Home Agent address in the home network. The information may be provided in one or more fields or extensions/options of the discovery packet.

FIG. 4 is a diagram illustrating an exemplary Mobile IP message that may be transmitted by a Mobile Node to a Home Agent to initiate the generation of a Mobile-Home authentication key for a particular session in accordance with one embodiment of the invention. As shown in FIG. 4, the Mobile IP message 400 includes an IP header 402 that identifies a source address (e.g., collocated care-of address) and a destination address (e.g., Home Agent IP address). The Mobile Node may also provide its public key 404 in the Mobile IP message 400, thereby enabling a Home Agent that does not already have the public key of the Mobile Node to obtain it from the Mobile IP message 400. Alternatively, the Mobile Node may provide a random shared key 404 in the Mobile IP message 400. Using the random shared key or public key of the Mobile Node 404, the Home Agent may encrypt its "reply" message to the Mobile Node. The Mobile Node may then decrypt the reply message using the random shared key or the Mobile Node's private key.

In order to secure the Mobile IP message 400, the Mobile Node may encrypt the message 400 or a portion of the message 400. A Mobile-Home Authentication Header (or Extension) 414 includes an authentication code generated by hashing the entire message with the random shared key (or the Home Agent's public key) using HMAC-MID5???. It is also possible to encrypt only a portion of the message 400 such as the random shared key, with the Home Agent's public key. The Home Agent receiving the message 400 may therefore decrypt the random shared key with its private key, and use the random shared key to encrypt its "reply" message, as well as subsequent messages. Alternatively, the Home Agent simply decrypts the entire message with its private key.

The Mobile IP message 400 may also include a token 406 to be used by the Home Agent to generate the Mobile-Home authentication key (or the Mobile-Home authentication key itself), a Mobile Node identifier 408 *a*, and a suggested home address 410 (e.g., old home address or collocated care-of address). The Mobile Node may also provide its source address 412 in the body of the Mobile IP message 400 to enable the Home Agent to check the source address in the body against that provided in the header of the first Mobile IP message, thereby helping to prevent spoofing by another node. The Mobile Node may also provide a suggested lifetime 416 in the Mobile IP message 400.

The Mobile Node may also provide a session identifier 418 that identifies the session in the Mobile IP message 400. The session identifier may be useful in order to track multiple sessions associated with a single home address (or Mobile Node). For instance, a single Mobile Node may support multiple sessions via multiple interfaces. The session identifier may be randomly generated by the Mobile Node.

The Mobile IP message 400 may be a registration request transmitted in accordance with Mobile IPv4 or a Binding Update message transmitted in accordance with Mobile IPv6. The information may be provided in one or more fields or extensions/options of the Mobile IP message 400.

FIG. 5 is a diagram illustrating an exemplary Mobile IP message that may be transmitted by a Home Agent to the Mobile Node in order to provide an allocated home address and lifetime to the Mobile Node in accordance with one embodiment of the invention. As shown in FIG. 5, Mobile IP message 500 will include an IP header 502 that identifies a source address (e.g., Home Agent address) and a destination address (e.g., collocated care-of address).

In order to secure the Mobile IP message 500, the Home Agent may encrypt the message 500 or a portion of the message 500. A Mobile-Home Authentication Header (or Extension) 504 includes an authentication code generated by hashing the entire message with the random shared key (or the Mobile Node's public key) using HMAC-MD5. In addition, it is also possible to encrypt only a portion of the message 500 such as the token, with the Mobile Node's public key. Thus, authentication of the message and encryption of the token may both be performed. The Mobile Node receiving the message 500 may therefore decrypt the message 500 or a portion thereof (e.g., token) with its private key and generate the Mobile-Home authentication key using the token.

The Mobile IP message 500 may further include a Mobile Node identifier 506 identifying the Mobile Node. The Mobile IP message 500 will also include the allocated home address 508 and the assigned lifetime 510 to be applied to the binding (and Mobile-Home authentication key). The lifetime 510 may also be applied to limit the time during which the allocated home address may be used by the Mobile Node. Alternatively, a separate lifetime may be provided in the Mobile IP message 500 to specify the lifetime for the Mobile-Home authentication key that has been generated (and possibly the home address that has been allocated for use during this session) (not shown).

The Mobile IP message 500 may also identify the Home Agent 512. For instance, the Mobile IP message 500 may be forwarded via another Home Agent. Therefore, the Home Agent registering the Mobile Node may not be the Home Agent identified in the source address of the Mobile IP message 500.

The Home Agent may also provide the destination address 514 (e.g., collocated care-of address) in the body of the Mobile IP message 500 to enable the Mobile Node to check the destination address in the body against its own address (e.g., that provided in the destination field of the header of the Mobile IP message 500), thereby helping to prevent spoofing by another node. The Mobile IP message 500 may also include a token 516 to be used by the Mobile Node to generate the Mobile-Home authentication key. The Home Agent may also provide a session identifier 518 that identifies the session in the Mobile IP message 500.

The Mobile IP message 500 may be a registration reply transmitted in accordance with Mobile IPv4 or a Binding Acknowledgement message transmitted in accordance with Mobile IPv6. The information may be provided in one or more fields or extensions/options of the Mobile IP message 500.

Once the Mobile-Home authentication key is established, it is used for the remainder of the session for the authentication of mobility services. Specifically, the Mobile-Home authentication key is used to secure subsequent registrations to enable the Mobile Node to notify the Home Agent of its current point of attachment (e.g., Foreign Agent or Access Router) or to extend its lifetime. Since keys established in this way are inherently "insecure," they should not have a lifetime exceeding the mobility session and should not be used to seed other security associations.

The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, and optical data storage devices.

The apparatus (e.g. Mobile Node, Home Agent, Foreign Agent) of this invention may be specially constructed for the required purposes, or may be a general purpose programmable machine selectively activated or reconfigured by a computer program stored in memory. The processes presented herein are not inherently related to any particular router or other apparatus. In a preferred embodiment, any of the Home and Foreign Agents of this invention may be specially configured routers such as specially configured router models 1700, 1800, 2500, 2600, 3200, 3600, 4000, 4500, 4700, 7200, and 7500 available from Cisco Systems, Inc. of San Jose, Calif. A general structure for some of these machines will appear from the description given below.

Generally, the dynamic Mobile-Home key generation and registration technique of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid route optimization system of this invention is preferably implemented on a general-purpose programmable machine selectively activated or reconfigured by a computer program stored in memory. Such programmable machine may be a network device designed to handle network traffic. Such network devices typically have multiple network interfaces including frame relay, ISDN, and wireless interfaces, for example. Specific examples of such network devices include routers and switches. For example, the roaming systems of this invention may be specially configured routers such as specially configured router models 350, 1100, 1200, 1400, 1600, 2500, 2600, 3200, 3600, 4500, 4700, 7200, 7500, and 12000 available from Cisco Systems, Inc. of San Jose, Calif. A general architecture for some of these machines will appear from the description given below. In an alternative embodiment, the key generation and registration system may be implemented on a general-purpose network host machine such as a personal computer or workstation. Further, the invention may be at least partially implemented on a card (e.g., an interface card) for a network device or a general-purpose computing device.

Figure 6:
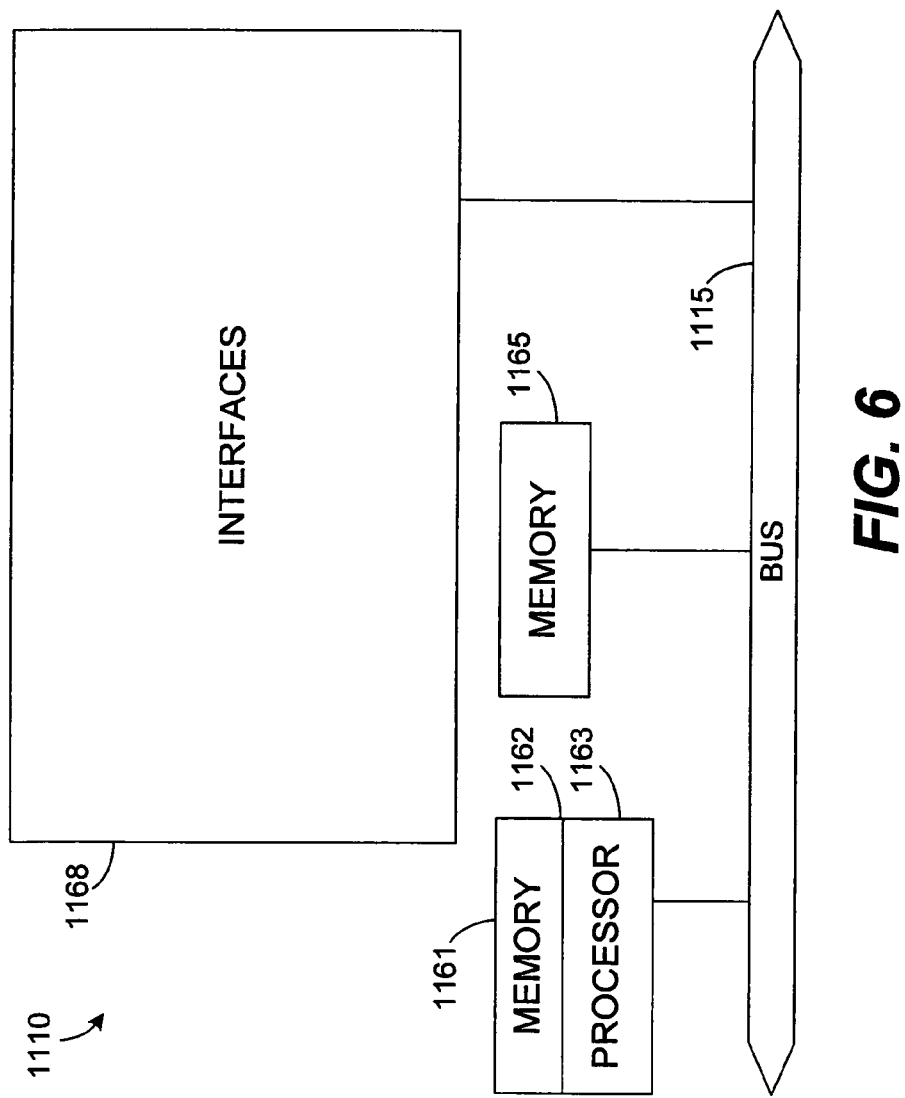
FIG. 6 is a diagrammatic representation of a router in which embodiments of the present invention may be implemented.

Referring now to FIG. 6, a router 1110 suitable for implementing the present invention includes a master central processing unit (CPU) 1162, interfaces 1168, and a bus 1115 (e.g., a PCI bus). When acting under the control of appropriate software or firmware, the CPU 1162 is responsible for such router tasks as routing table computations and network management. It may also be responsible for updating mobility binding and visitor tables, etc. It preferably accomplishes all these functions under the control of software including an operating system (e.g., the Internetwork Operating System (IOS®) of Cisco Systems, Inc.) and any appropriate applications software. CPU 1162 may include one or more processors 1163 such as a processor from the Motorola family of microprocessors or the MIPS family of microprocessors. In an alternative embodiment, processor 1163 is specially designed hardware for controlling the operations of router 1110. In a specific embodiment, a memory 1161 (such as non-volatile RAM and/or ROM) also forms part of CPU 1162. However, there are many different ways in which memory could be coupled to the system.

The interfaces 1168 are typically provided as interface cards (sometimes referred to as "line cards"). Generally, they control the sending and receiving of data packets over the network and sometimes support other peripherals used with the router 1110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1162 to efficiently perform routing computations, network diagnostics, security functions, etc.

Although the system shown in FIG. 6 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 1161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. For instance, the disclosed message formats are merely illustrative, and therefore other messages may be used to initiate and accomplish the generation of the Mobile-Foreign and Foreign-Home authentication keys. For instance, the scheme used to generate and exchange tokens (i.e., key material) between two parties and generate the Mobile-Home authentication key in the above-disclosed embodiments may be any suitable key exchange scheme. Moreover, although the example described refers primarily to IPv4 and IPv6, the present invention may be used with IP addresses that conform to other versions of IP. Therefore, the described embodiments should be taken as illustrative and not restrictive, and the invention should not be limited to the details given herein but should be defined by the following claims and their full scope of equivalents.

What is claimed is:

1. In a Home Agent, a method of supporting a session in Mobile IP, comprising:
   receiving by the Home Agent a first Mobile IP message identifying a Mobile Node from the Mobile Node, wherein the first Mobile IP message indicates to the Home Agent that the Mobile Node is requesting dynamic configuration of a Mobile-Home authentication key to be shared between the Mobile Node and the Home Agent during the session, wherein the first Mobile IP message does not include the Mobile-Home authentication key and wherein the first Mobile IP message or a portion thereof is not encrypted by the Mobile-Home authentication key;
   in response to the first Mobile IP message, generating by the Home Agent a Mobile-Home authentication key to be shared between the Home Agent and the Mobile Node during the session; and
   sending by the Home Agent a second Mobile IP message identifying the Home Agent to the Mobile Node, the second Mobile IP message including a lifetime and a first token to be used by the Mobile Node for generating the Mobile-Home authentication key, the lifetime being associated with the session and the Mobile-Home authentication key such that the Mobile-Home authentication key is not valid after the session has ended or during another session, thereby enabling the Mobile Node to encrypt messages to the Home Agent during the session using the Mobile-Home authentication key.

2. The method as recited in claim 1, further comprising:
   associating the Mobile-Home authentication key with the Mobile Node and the lifetime.

3. The method as recited in claim 1, further comprising:
   obtaining information from the first Mobile IP message; and
   wherein the Mobile-Home authentication key is generated using the information obtained from the first Mobile IP message.

4. The method as recited in claim 3, wherein a second token generated by the Mobile Node is provided in the first Mobile IP message and wherein the information comprises the second token generated by the Mobile Node.

5. The method as recited in claim 1, wherein the session is initiated when the Mobile Node boots up.

6. The method as recited in claim 1, wherein the session ends when the Mobile Node reboots.

7. The method as recited in claim 1, further comprising:
   receiving a third Mobile IP message including the home address, the third Mobile IP message being a registration request or a binding update; and
   sending a fourth Mobile IP message including the home address, the fourth Mobile IP message being a registration reply or a binding acknowledgement, wherein both the third and fourth Mobile IP message are encrypted using the Mobile-Home authentication key.

8. The method as recited in claim 7, wherein the third Mobile IP message requests an extension of the lifetime of the Mobile-Home authentication key.

9. The method as recited in claim 1, wherein the first Mobile IP message is a registration request or a Binding Update, and the second Mobile IP message is a registration reply or a Binding Acknowledgement.

10. The method as recited in claim 1, wherein the session is identified by a session identifier in the first, second, third, and fourth Mobile IP message.

11. The method as recited in claim 1, wherein at least a portion of the first Mobile IP message and the second Mobile IP message are encrypted, wherein the at least a portion of the first Mobile IP message is encrypted using the Home Agent's public key, the method further comprising:

decrypting by the Home Agent the at least a portion of the first Mobile IP message using a private key of the Home Agent.

12. The method as recited in claim 11, wherein the portion of the first Mobile IP message includes a second token generated by the Mobile Node to be used by the Home Agent to generate the Mobile-Home authentication key.

13. The method as recited in claim 11, wherein the second Mobile IP message is encrypted using the Mobile Node's public key, the method further comprising:

encrypting the second Mobile IP message using the Mobile Node's public key.

14. The method as recited in claim 13, wherein the Mobile Node's public key is provided in the first Mobile IP message, the method further comprising:

obtaining the Mobile Node's public key from the first Mobile IP message.

15. The method as recited in claim 1, wherein the sending step is performed without authenticating the Mobile Node in Mobile IP.

16. The method as recited in claim 15, wherein the Mobile Node is not authenticated using a shared security association.

17. The method as recited in claim 15, wherein the Mobile Node is authenticated during layer 2 or layer 3 authentication prior to the receiving step.

18. The method as recited in claim 15, wherein the first Mobile IP message includes a Mobile Node identifier identifying the Mobile Node, wherein the Mobile Node identifier is not authenticated by the Home Agent.

19. The method as recited in claim 1, wherein the first Mobile IP message includes a suggested lifetime and wherein the lifetime provided in the second Mobile IP message is less than or equal to the suggested lifetime.

20. The method as recited in claim 1, wherein a body of the first Mobile IP message includes a source address provided in a header of the first Mobile IP message, the method further comprising:

determining whether the source address provided in the header of the first Mobile IP message is equal to the source address in the body of the first Mobile IP message.

21. The method as recited in claim 1, further comprising:
receiving messages from the Mobile Node during the session, wherein the messages are encrypted using the Mobile-Home authentication key.

22. The method as recited in claim 1, further comprising:
generating by the Home Agent the first token.

23. In a Mobile Node, a method, comprising:
composing and sending by the Mobile Node a first Mobile IP message identifying the Mobile Node to a Home Agent, wherein the first Mobile IP message indicates to the Home Agent that the Mobile Node is initiating dynamic configuration of a Mobile-Home authentication key to be shared between the Mobile Node and the Home Agent during a session, wherein the first Mobile IP message does not include the Mobile-Home authentication key and wherein the first Mobile IP message or a portion thereof is not encrypted by the Mobile-Home authentication key;

receiving by the Mobile Node a second Mobile IP message identifying the Mobile Node from the Home Agent, the second Mobile IP message including a lifetime and a first token to be used by the Mobile Node for generating the Mobile-Home authentication key, the lifetime being associated with the session and the Mobile-Home authentication key such that the Mobile-Home authentication key is not valid after the session has ended or during another session;

obtaining by the Mobile Node the first token from the second Mobile IP message; and generating by the Mobile Node the Mobile-Home authentication key to be shared between the Home Agent and the Mobile Node during the session using the first token.

24. The method as recited in claim 23, further comprising:
sending a third Mobile IP message including an IP address of the Home Agent, the third Mobile IP message being a registration request or a binding update and being secured by the Mobile-Home authentication key; and receiving a fourth Mobile IP message from the Home Agent, the fourth Mobile IP message being a registration reply or a binding acknowledgement, wherein the fourth Mobile IP message is encrypted by the Mobile-Home authentication key.

25. The method as recited in claim 24, wherein sending the third Mobile IP message is performed to extend the lifetime associated with the session and the Mobile-Home authentication key to be shared between the Home Agent and the Mobile Node during the session.

26. The method as recited in claim 23, wherein the session is initiated when the Mobile Node boots up.

27. The method as recited in claim 23, wherein the session ends when the Mobile Node reboots.

28. The method as recited in claim 23, wherein the first Mobile IP message is a registration request or a Binding Update, and the second Mobile IP message is a registration reply or a Binding Acknowledgement.

29. The method as recited in claim 23, wherein at least a portion of the first Mobile IP message and the second Mobile IP message are encrypted, wherein the at least a portion of the first Mobile IP message is encrypted using the Home Agent's public key, the method further comprising:

encrypting the at least a portion of the first Mobile IP message using the Home Agent's public key.

30. The method as recited in claim 29, wherein the second Mobile IP message is encrypted using the Mobile Node's public key, the method further comprising:

decrypting the second Mobile IP message using the Mobile Node's private key.

31. The method as recited in claim 30, wherein the Mobile Node's public key is provided in the first Mobile IP message, the method further comprising:

providing the Mobile Node's public key in the first Mobile IP message.

32. The method as recited in claim 23, wherein the Mobile Node is not authenticated in Mobile IP.

33. The method as recited in claim 32, wherein the Mobile Node is authenticated during layer 2 or layer 3 authentication.

34. The method as recited in claim 23, wherein the Mobile Node is not authenticated via a shared security association prior to obtaining the Mobile-Home authentication key.

35. The method as recited in claim 23, wherein the first Mobile IP message includes a suggested lifetime and wherein the lifetime provided in the second Mobile IP message is less than or equal to the suggested lifetime.

36. The method as recited in claim 23, further comprising:
encrypting by the Mobile Node a message using the Mobile-Home authentication key to generate an encrypted message; and transmitting by the Mobile Node the encrypted message to the Home Agent.

37. The method as recited in claim 23, further comprising:
encrypting messages to the Home Agent using the Mobile-Home authentication key during the session.

38. A non-transitory computer-readable storage medium storing thereon computer-readable instructions for supporting a session in Mobile IP in a Home Agent, comprising:
instructions for determining from a first Mobile IP message received from a Mobile Node and identifying the Mobile Node that the Mobile Node is requesting dynamic configuration of a Mobile-Home authentication key to be shared between the Mobile Node and the Home Agent during the session, wherein the first Mobile IP message does not include the Mobile-Home authentication key and wherein the first Mobile IP message or a portion thereof is not encrypted by the Mobile-Home authentication key;
instructions for in response to the first Mobile IP message, generating a Mobile-Home authentication key to be shared between the Home Agent and the Mobile Node during the session; and
instructions for sending a second Mobile IP message identifying the Home Agent to the Mobile Node, the second Mobile IP message including a lifetime and a first token to be used by the Mobile Node for generating the Mobile-Home authentication key, the lifetime being associated with the session and the Mobile-Home authentication key such that the Mobile-Home authentication key is not valid after the session has ended or during another session, thereby enabling the Mobile Node to encrypt messages to the Home Agent during the session using the Mobile-Home authentication key.

39. A Home Agent adapted for supporting a session in Mobile IP, comprising:
means for receiving a first Mobile IP message identifying a Mobile Node from the Mobile Node, wherein the first Mobile IP message indicates to the Home Agent that the Mobile Node is requesting dynamic configuration of a Mobile-Home authentication key to be shared between the Mobile Node and the Home Agent during the session, wherein the first Mobile IP message does not include the Mobile-Home authentication key and wherein the first Mobile IP message or a portion thereof is not encrypted by the Mobile-Home authentication key;
means for in response to the first Mobile IP message, generating a Mobile-Home authentication key to be shared between the Home Agent and the Mobile Node during the session; and
means for sending a second Mobile IP message identifying the Home Agent to the Mobile Node, the second Mobile IP message including a lifetime and a first token to be used by the Mobile Node for generating the Mobile-Home authentication key, the lifetime being associated with the session and the Mobile-Home authentication key such that the Mobile-Home authentication key is not valid after the session has ended or during another session, thereby enabling the Mobile Node to encrypt messages to the Home Agent during the session using the Mobile-Home authentication key.

40. A Home Agent adapted for supporting a session in Mobile IP, comprising:
a processor; and
a memory, at least one of the processor and the memory being adapted for:
receiving a first Mobile IP message identifying a Mobile Node from the Mobile Node, wherein the first Mobile IP message indicates to the Home Agent that the Mobile Node is requesting dynamic configuration of a Mobile-Home authentication key to be shared between the Mobile Node and the Home Agent during the session, wherein the first Mobile IP message does not include the Mobile-Home authentication key and wherein the first Mobile IP message or a portion thereof is not encrypted by the Mobile-Home authentication key;
in response to the first Mobile IP message, generating a Mobile-Home authentication key to be shared between the Home Agent and the Mobile Node during the session; and
sending a second Mobile IP message identifying the Home Agent to the Mobile Node, the second Mobile IP message including a lifetime and a first token to be used by the Mobile Node for generating the Mobile-Home authentication key, the lifetime being associated with the session and the Mobile-Home authentication key such that the Mobile-Home authentication key is not valid after the session has ended or during another session, thereby enabling the Mobile Node to encrypt messages to the Home Agent during the session using the Mobile-Home authentication key.

41. An apparatus, comprising:
a processor; and
a memory, at least one of the processor or the memory being configured for:
composing and sending by a Mobile Node a first Mobile IP message identifying the Mobile Node to a Home Agent, wherein the first Mobile IP message indicates to the Home Agent that the Mobile Node is initiating dynamic configuration of a Mobile-Home authentication key to be shared between the Mobile Node and the Home Agent during a session, wherein the first Mobile IP message does not include the Mobile-Home authentication key and wherein the first Mobile IP message or a portion thereof is not encrypted by the Mobile-Home authentication key;
receiving by the Mobile Node a second Mobile IP message identifying the Mobile Node from the Home Agent, the second Mobile IP message including a lifetime and a first token to be used by the Mobile Node for generating the Mobile-Home authentication key, the lifetime being associated with the session and the Mobile-Home authentication key such that the Mobile-Home authentication key is not valid after the session has ended or during another session; and
obtaining by the Mobile Node the first token from the second Mobile IP message; and
generating by the Mobile Node the Mobile-Home authentication key to be shared between the Home Agent and the Mobile Node during the session using the first token.

42. A non-transitory computer-readable medium storing thereon computer-readable instructions for performing a method, comprising:
composing and sending by a Mobile Node a first Mobile IP message identifying the Mobile Node to a Home Agent, wherein the first Mobile IP message indicates to the Home Agent that the Mobile Node is initiating dynamic configuration of a Mobile-Home authentication key to be shared between the Mobile Node and the Home Agent during a session, wherein the first Mobile IP message does not include the Mobile-Home authentication key and wherein the first Mobile IP message or a portion thereof is not encrypted by the Mobile-Home authentication key;
receiving by the Mobile Node a second Mobile IP message identifying the Mobile Node from the Home Agent, the second Mobile IP message including a lifetime and a first token to be used by the Mobile Node for generating the Mobile-Home authentication key, the lifetime being associated with the session and the Mobile-Home authentication key such that the Mobile-Home authentication key is not valid after the session has ended or during another session; and obtaining by the Mobile Node the first token from the second Mobile IP message; and generating by the Mobile Node the Mobile-Home authentication key to be shared between the Home Agent and the Mobile Node during the session using the first token.

* * * * *